United States Patent
Thint et al.

(10) Patent No.: US 7,243,105 B2
(45) Date of Patent: Jul. 10, 2007

(54) METHOD AND APPARATUS FOR AUTOMATIC UPDATING OF USER PROFILES

(75) Inventors: Marcus Thint, Boca Raton, FL (US); Simon J Case, Saxmundham (GB)

(73) Assignee: British Telecommunications public limited company, London (GB)

( * ) Notice: Subject to any disclaimer, the term of this patent is extended or adjusted under 35 U.S.C. 154(b) by 401 days.

(21) Appl. No.: 10/334,117

(22) Filed: Dec. 31, 2002

(65) Prior Publication Data

US 2004/0128301 A1 Jul. 1, 2004

(51) Int. Cl.
*G06F 17/00* (2006.01)

(52) U.S. Cl. .................. 707/101; 707/102; 707/103 R; 707/104.1

(58) Field of Classification Search ........ 707/100–102, 707/104.1, 103 R; 345/327; 700/83, 17
See application file for complete search history.

(56) References Cited

U.S. PATENT DOCUMENTS

| | | | | |
|---|---|---|---|---|
| 4,977,455 A | * | 12/1990 | Young | 348/460 |
| 5,151,789 A | * | 9/1992 | Young | 725/133 |
| 5,351,075 A | * | 9/1994 | Herz et al. | 725/13 |
| 6,020,883 A | * | 2/2000 | Herz et al. | 715/721 |
| 6,400,996 B1 | * | 6/2002 | Hoffberg et al. | 700/83 |
| 2002/0049848 A1 | | 4/2002 | Lin et al. | |
| 2002/0152237 A1 | | 10/2002 | Cohen et al. | |
| 2004/0030741 A1 | * | 2/2004 | Wolton et al. | 709/202 |
| 2004/0073918 A1 | * | 4/2004 | Ferman et al. | 725/34 |

FOREIGN PATENT DOCUMENTS

| | | |
|---|---|---|
| GB | 2354089 A | 3/2001 |
| WO | WO 02/080056 A2 | 10/2002 |

* cited by examiner

*Primary Examiner*—Sana Al-Hashemi
(74) *Attorney, Agent, or Firm*—Nixon & Vanderhye P.C.

(57) ABSTRACT

Appropriate updates to a respective user profile are inferred from monitored user activity. Such updates are suitable for use with applications programs that customize services based upon data and attributes stored in a user profile. The apparatus is arranged to personalize various aspects of a preferred profile updating process on the basis of stored user preferences, applying meta-rules to apply those user preferences to the definition of a set of personalized rule weights to be applied in a fuzzy inference process that infers profile updates by applying fuzzy rules and fuzzy sets to the analysis of event statistics derived from the results of user monitoring. The personalized rule weights are applied to selectively adjust the effect of particular fuzzy rules. In addition, mapping of event statistics to fuzzy rule premises in the fuzzy inference process may be personalized through the use of user-defined fuzzy sets.

10 Claims, 10 Drawing Sheets

METHOD AND APPARATUS FOR AUTOMATIC UPDATING OF USER PROFILES

BACKGROUND

1. Technical Field

The present invention relates to profile management systems and, in particular, to a method and apparatus for updating user profiles based upon personalized reasoning about user activity.

2. Related Art

It is known to provide online products and services customised in their operation to particular users according to information contained in respective user profiles. It is also known to update user profiles automatically over time to keep track of changes observed in a user's interests, and for application programs implementing products and services to adapt to such changes.

In a co-pending international patent application number PCT/GB02/01421 by the present Applicants, published under reference WO 02/080056, a profile management system is described in which a user profile is generated, the profile comprising a weighted selection of keywords representing the user's interests and attributes of those interests. Interest attributes may include expertise level of the user in respect of a particular interest, an importance rating for the interest, a privacy marking in respect of the interest and a duration factor relating to the duration of the interest. These attributes may be set as appropriate by a user. In addition, weights may be assigned to certain of those attributes, not only to indicate the relevance/importance of the attribute to the interest, but also to suit the individual user, providing a high degree of "fine-tuning" in profiles and hence to products and services that access those profiles. A method is also described for updating a user profile generated by that system, in particular for using a fuzzy inference engine and pre-designed fuzzy sets and fuzzy rules to semi-automatically update weightings associated with keywords and attributes of interests stored within a user's profile, on the basis of the user's information retrieval activity.

A paper entitled "Designing Agents for a Virtual Marketplace" by K. Kamyab, F. Guerin, P. Goulev and E. Mambani, Imperial College of Science, Technology and Medicine, London, describes a multi-agent architecture for a virtual sales assistant, including the idea of using pre-designed fuzzy sets and fuzzy rules to model a user's product preferences (e.g. to model linguistic terms such as "like", "dislike") and product descriptions (e.g. qualitative concepts such as "cheap", "expensive"). Differing user perceptions of the meaning of these terms are modeled by varying the distribution of membership functions within each fuzzy set. An agent captures feedback from a user and uses a fuzzy inference engine to update the model of user preferences in respect of particular products.

Known arrangements for generating updates to a user profile using fuzzy inference may be represented in overview as shown in FIG. 1. Referring to FIG. 1, a fuzzy inference engine 100 is provided to infer updates to a user profile 105 according to predefined fuzzy rules 110 and fuzzy sets 115 on the basis of input event statistics 120, e.g. results from the monitoring of documents accessed by a user and feedback by the user as to the relevance of accessed documents to the user's interests. For example, the fuzzy inference engine 100 may infer from the recent access by a user of documents relating to a particular category of interest, that this interest should be represented in the contents of the user's profile 105, so generating an update to add certain keywords to the profile 105, or to increase the value of a weighting associated with this interest if already represented in the profile 105. Fuzzy inference processes suitable for use in this arrangement are described for example in "Fuzzy Sets" by L. Zadeh, Journal of Information and Control, Volume 8, 1965, pp338-353, and "Fuzzy Logic Controllers", Parts 1 and 2, by C. Lee, IEEE Transactions on Systems, Management and Cybernetics, Volume 20, 1990, pp404-435.

It is known that user profiles (generated manually or by means of some automatic user modelling process) are essential to providing personalized products, information and services, for example in the context of the Internet or over corporate intranets. It is also known that these user profiles, describing user interests/needs and preferences, may change over time and that automatic systems capable of detecting these changes and making corresponding updates to profile data are highly desirable. However, whereas prior art arrangements are known to employ, for example, fuzzy sets to represent certain user preferences and to employ pre-designed fuzzy rules to infer updates to a user's profile, they offer little in the way of user control and personalisation of the profile update process itself.

BRIEF SUMMARY

According to a first aspect of the present invention there is provided an apparatus for use in updating a user profile, the user profile being suitable for use in providing customised services to a respective user, the apparatus comprising:

an input for receiving event statistics relating to a user's activity;

a first rule store for storing a first set of rules;

an inference engine for inferring updates to a user profile for the user according to said first set of rules using event statistics received at said input;

a store for storing user preference data;

a store for storing a set of personalized rule weightings in respect of said user;

a second rule store for storing a second set of rules;

adjustment means for adjusting said personalized rule weightings according to said second set of rules and with reference to said stored user preference data; and wherein said inference engine is arranged to use said personalized rule weightings in the application of said first set of rules to the inference of profile updates and thereby to determine and output a set of at least one update to the user profile.

Preferred embodiments according this first aspect of the present invention provide a number of features and benefits, in particular:

automatic update of user profile components (content and attribute data) independently of products or services that make use of that user profile data;

support of user control over the profile update generation process itself, with personalisation of various parts of the process controlled by user preference settings, e.g. defining which attributes may be adjusted in a profile, providing a personalized definition of "short" and "long" term time intervals and other input parameters;

approximate reasoning capability in the domain of imprecise or incomplete input data, using fuzzy sets and fuzzy logic enabling mathematical representation of subjective and ambiguous terms for processing by intuitive, linguistic rules;

enhancement of a traditional fuzzy processing engine by means of integrated meta-rules that specify personalized rule weights which in turn affect the strength of contribution of associated rules, ranging from full contribution to no contribution; and provision of an interface for external control of the profile update process, enabling adjustment of profile attributes by an external request, so providing means for interoperation with other agents or systems.

In a preferred embodiment of the present invention, fuzzy set representation of system parameters and rule-based fuzzy logic reasoning are used to deal with imprecise and incomplete information. For example, the inference engine is arranged to reason with fuzzy concepts such as 'low', 'frequently', 'slightly', etc. This approach is advantageous since the meaning and interpretation of user actions, expertise levels, or preferences, is not in practice precise, and even explicit feedback (e.g. user ratings) are subjective. Profile update actions must often be executed without complete data, e.g. not all the input data evaluated through criteria in the inference rules may be concurrently available so that only a subset of rules may contribute to an update decision. The effect of conflicting rules may be resolved through an appropriate defuzzification strategy.

Preferred embodiments of the present invention may be applied to: (i) accommodate user profiles in a variety of applications, e.g. information management, e-commerce, customer relationship management; (ii) accommodate a variety of system inputs, e.g. system resource usage statistics, interaction records, user feedback, and associated rules; (iii) allow for personal preference settings of parameters that affect the profile update process; and (iv) co-exist and interoperate with other specialised processing modules.

In a typical implementation, preferred embodiments of the present invention may form part of a profile management module within a suite of application programs providing services to an individual user or to a group of users in an e-community. The profile management module collects evidence of user activity from the host application programs as input data and applies rule-based approximate reasoning to ascertain appropriate changes to respective user profiles.

According to a second aspect of the present invention, there is provided a method of updating a user profile, the user profile being suitable for use in providing customised services to a respective user, the method comprising the steps of:

(i) storing a first set of rules;
(ii) generating a set of personalized rule weightings according to a second set of rules and with reference to a set of user preference data;
(iii) receiving event statistics relating to a user's activity; and
(iv) applying an inference engine to infer and output at least one update to a profile for the user according to said first set of rules weighted according to said generated set of personalized rule weightings, using said received event statistics.

BRIEF DESCRIPTION OF THE DRAWINGS

Preferred embodiments of the present invention will now be described in more detail, by way of example only, with reference to the accompanying drawings of which.

DETAILED DESCRIPTION OF EXEMPLARY EMBODIMENTS

Overview of Preferred Embodiments

An apparatus according to preferred embodiments of the present invention will now be described with reference to FIG. 2.

Figure 1:
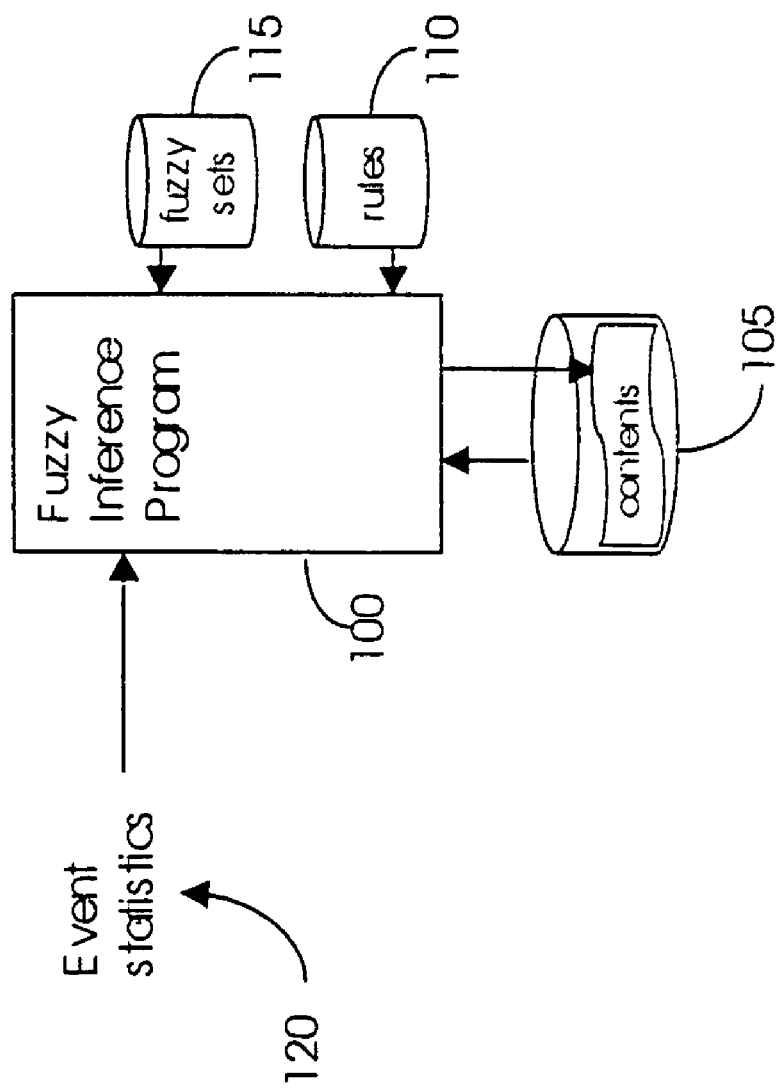
FIG. 1, already discussed above, is a diagram representing a prior art arrangement for updating the contents of a user profile using a fuzzy inference engine.
Figure 2:
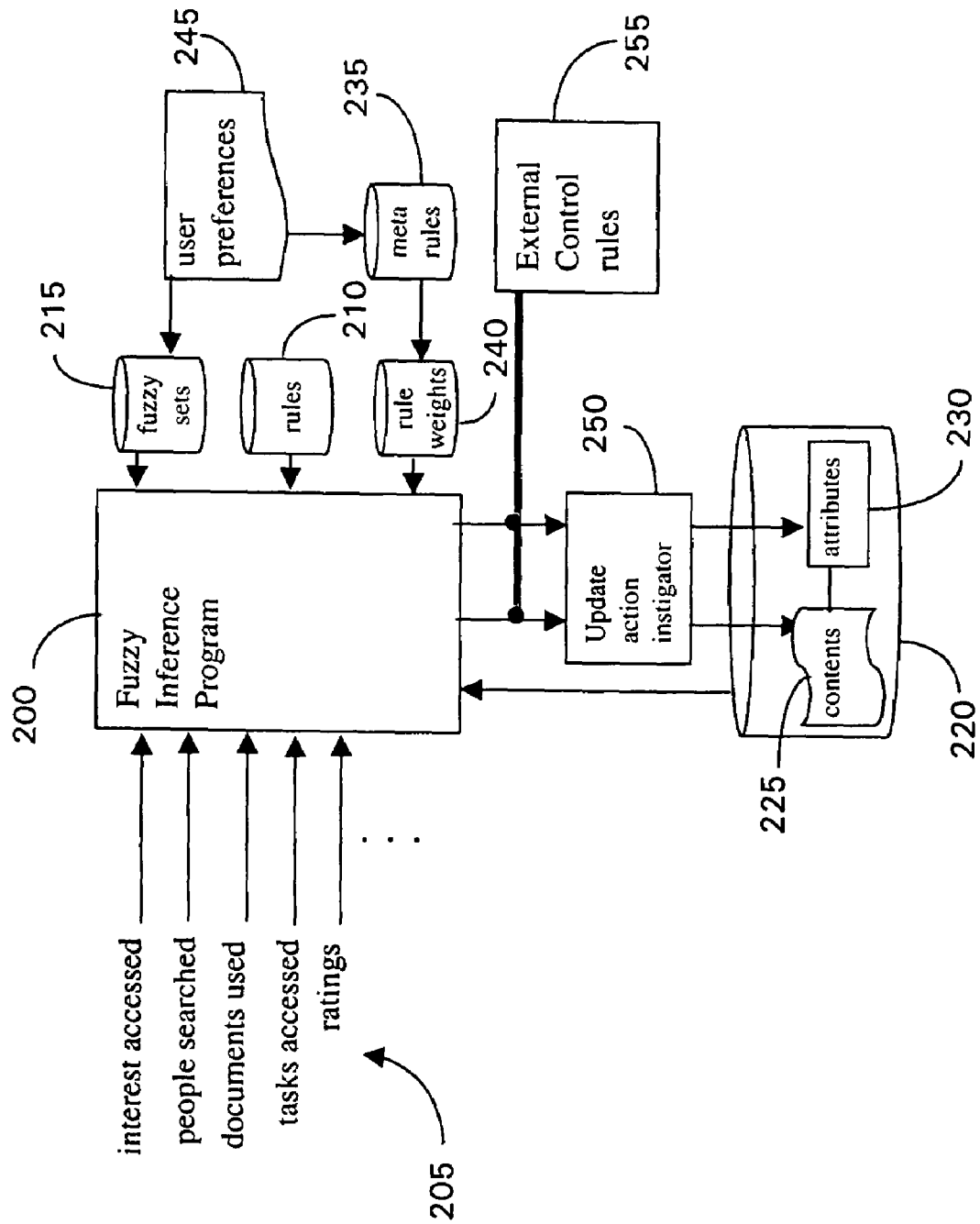
FIG. 2 is a diagram representing an apparatus for updating the contents of a user profile according to a preferred embodiment of the present invention.

Referring to FIG. 2, an inference engine 200, preferably a fuzzy inference engine, is arranged, in a similar way to that of the prior art arrangement of FIG. 1, to receive various event statistics 205 relating to activity by a particular user. Received event statistics 205 may comprise, for a particular category of interest, the number of documents accessed in a given unit time relating to that interest, the number of people identified or contacted relating to that interest, application programs used in relation to that interest and any feedback by the user indicative of the relevance of particular events to that interest. Event statistics such as these are preferably generated by known monitoring processes, arranged to monitor the activity of the user and to measure or derive a predetermined set of event statistics 205 likely to be useful in determining suitable updates to a profile for the user.

The fuzzy inference engine 200 is arranged to access a store of predefined fuzzy rules 210 and fuzzy sets 215, in a similar way to that of fuzzy inference engine 100 of FIG. 1, and to use these fuzzy rules 210 and fuzzy sets 215 to infer from the received event statistics 205 possible updates to data elements of a user profile 220 for the user. To this extent, the fuzzy inference engine 200 operates in a way that is well known. Preferably, the user profile 220 has a structure similar to that described in the above-referenced co-pending international patent application number PCT/GB02/01421 by the present Applicants, published under reference WO 02/080056, the user profile having contents 225, for example keywords and phrases defining each of a set of user interests, and associated attributes 230, e.g. importance, expertise or privacy markings for a particular interest. For "line-tuning"

of contents 225 and attributes 230, corresponding weightings (not shown in FIG. 2) may also be recorded in the user profile 220 in association with particular interests, keywords and attributes. Profile updates output by the fuzzy inference engine 200 may relate to either or both of the contents 225 and the associated attributes 230, or to any associated weightings.

The apparatus of FIG. 2 further comprises a store 235 of so-called meta-rules, literally "rules about rules", for use in adjusting a set of rule weights 240, a store for, or means for accessing, user preference data 245, and an update action instigator 250 for implementing profile updates output by the fuzzy inference engine 200. An input to the update action instigator 250 may also be provided to receive externally generated profile updates or to apply external control rules 255 to the action of updating a profile 220. Update action instigator 250 may be arranged to combine or otherwise schedule update actions received from the fuzzy inference engine 200 and external sources (255).

In preferred embodiments of the present invention, rule weights 240 are used by the fuzzy inference engine 200 in a process of selective application of fuzzy rules 210, providing one degree of personalisation in a preferred profile update inference process. User preference data 245 may comprise any data used within preferred embodiments of the present invention to personalize a part of the preferred profile update inference process for generating updates to the user profile 220. The various aspects of personalisation supported by preferred embodiments of the present invention will be described in more detail below. However, it can be seen from FIG. 2 that user preferences 245 may be used in particular to personalize fuzzy sets 215 and as an input to the operation of meta rules 235 to personalize the rule weights 240 in respect of a particular user or group of users.

While user preference data 245 are shown in FIG. 2 to be stored separately from user profiles 220, certain user preference data may in practice be stored as part of a respective user's profile 220, for example as attributes or other data entities within the profile 220 itself, and hence be subject to adjustment through profile updates output by fuzzy inference engine 200. Where user preference data are stored within the user profile 220 itself, those data may be accessed by the fuzzy inference engine 200, as shown in FIG. 2, as required to personalize certain aspects of the preferred profile update inference process, e.g. the analysis of input data 205.

Computing Environment

Preferred embodiments of the present invention may be used in both single and multi-user computing environments. In a multi-user environment, a preferred apparatus such as that shown in FIG. 2, may be implemented using a server linked to a suitable communications network, as will now be described with reference to FIG. 3.

Figure 3:
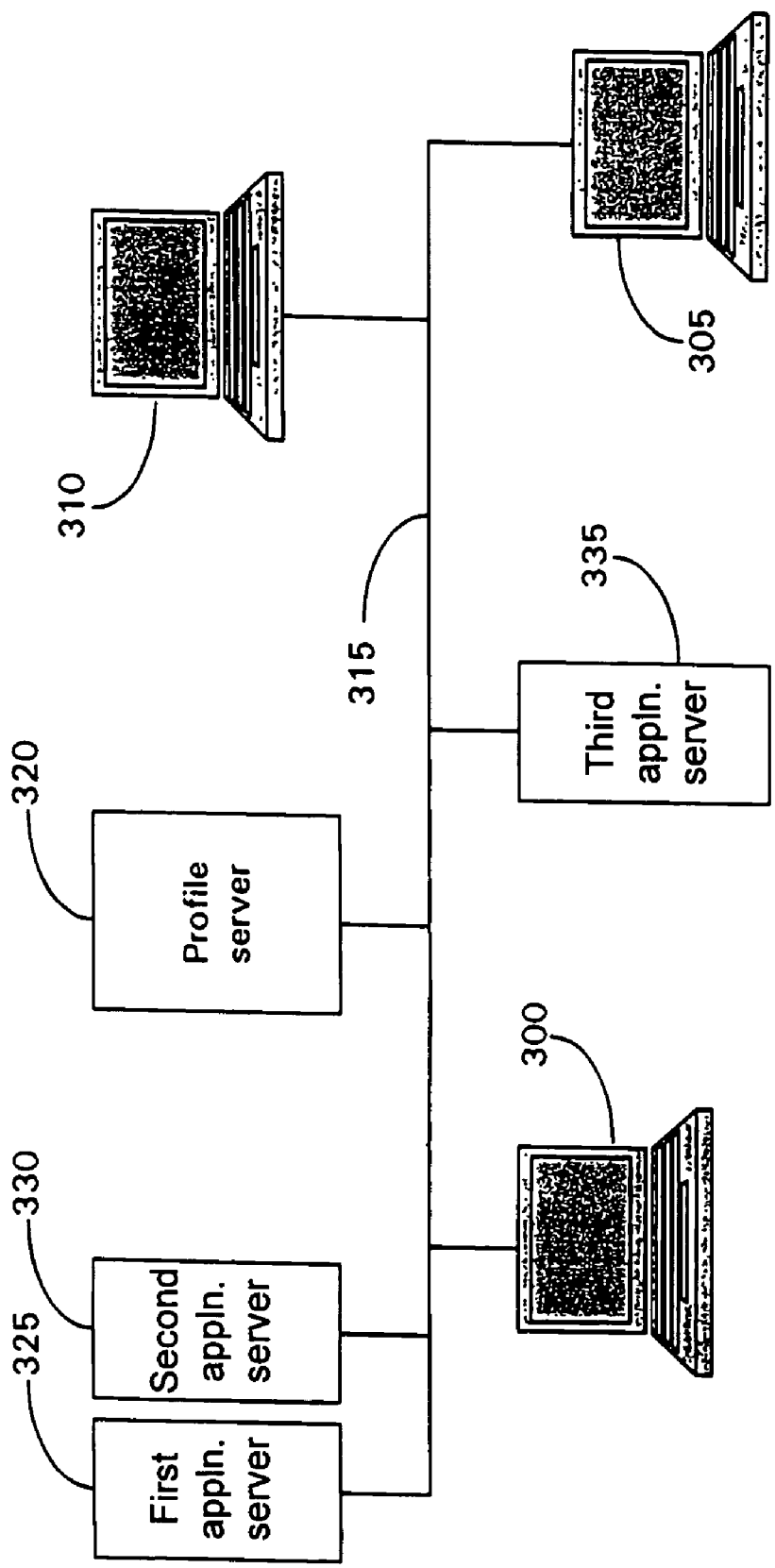
FIG. 3 is a diagram showing a network arrangement suitable for the deployment of an apparatus according to preferred embodiments of the present invention in support of multiple users.

Referring to FIG. 3, first, second and third client terminals 300, 305 and 310 are linked by means of a network 315 to a personal profile server 320. In addition, first, second and third application program servers 325, 330 and 335 are also shown linked to the network 315, providing access by client terminals 300-310 to application programs running on those application program servers 325-335, and to enable access by applications programs to respective user profiles stored and maintained by profile server 320. Preferred embodiments of the present invention may be implemented to run on the profile server 320, to receive event statistics relating to the monitored access to application programs 325-335 by users of client terminals 300-310, and to generate appropriate updates to respective user profiles stored on the profile server 320. The network 315 may comprise a local area network, the Internet or a combination of local area networks and the Internet. The client terminals 300-310 may comprise conventional personal computers running an operating system such as Microsoft Windows™, Windows NT™, MacOS™, Linux™, or Unix™, and browsers such as Internet Explorer™ or Netscape™ that support the HTTP protocol. The servers 320-335 may be conventional server computers running Unix™ or a similar operating system.

Figure 4:
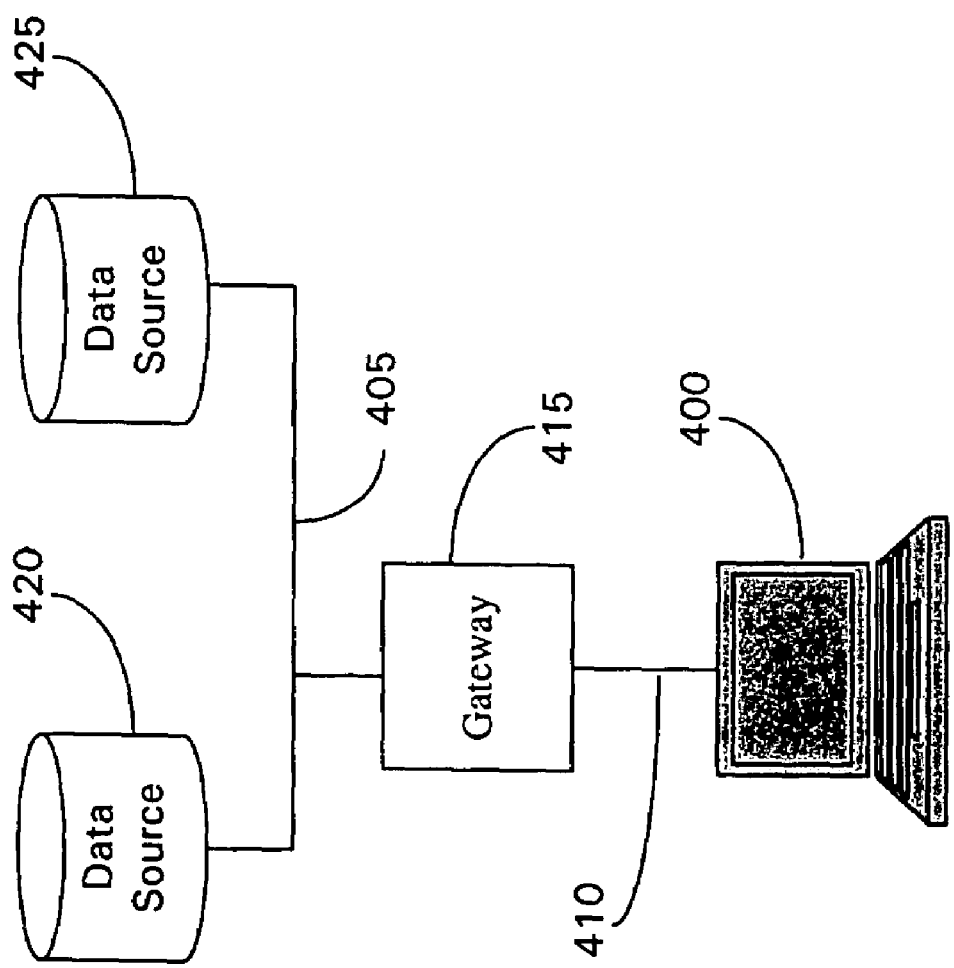
FIG. 4 is a diagram showing a network arrangement suitable for the deployment of an apparatus according to preferred embodiments of the present invention in support of a single user.

Preferred embodiments of the present invention can also be implemented to operate in the context of a single user computing environment as shown in FIG. 4. Referring to FIG. 4, a single user's personal computer 400 is connected to the Internet 405, or other information system, by means of a dial-up or persistent connection 410 to a gateway 415. Preferred embodiments of the present invention may be implemented to run on the user's personal computer 400 and to store a profile for the user on the personal computer 400, along with means to monitor the user's browsing activity, in particular access to data sources 420, 425 over the Internet 405 or access to local sources of information or application programs, to provide event statistics from which to infer appropriate updates to the user's profile.

User Profile Structure

A preferred structure for a user profile will now be described in overview with reference to FIG. 5. As mentioned above, profile updates generated by preferred embodiments of the present invention may be applied to user profiles having the preferred structure described in the present Applicant's co-pending international patent application number PCT/GB02/01421, published under reference WO 02/080056. A user profile of the preferred structure may represent an individual user or a designated group of users. In each case, the user profile provides personal information enabling application programs to provided personalized services to that user or group of users. The user profile may be initially constructed manually, or by means of semi-automated mechanisms, for example that described in the above-referenced co-pending patent application, although the particular means for generating the user profile is not material to the present invention.

Figure 5:
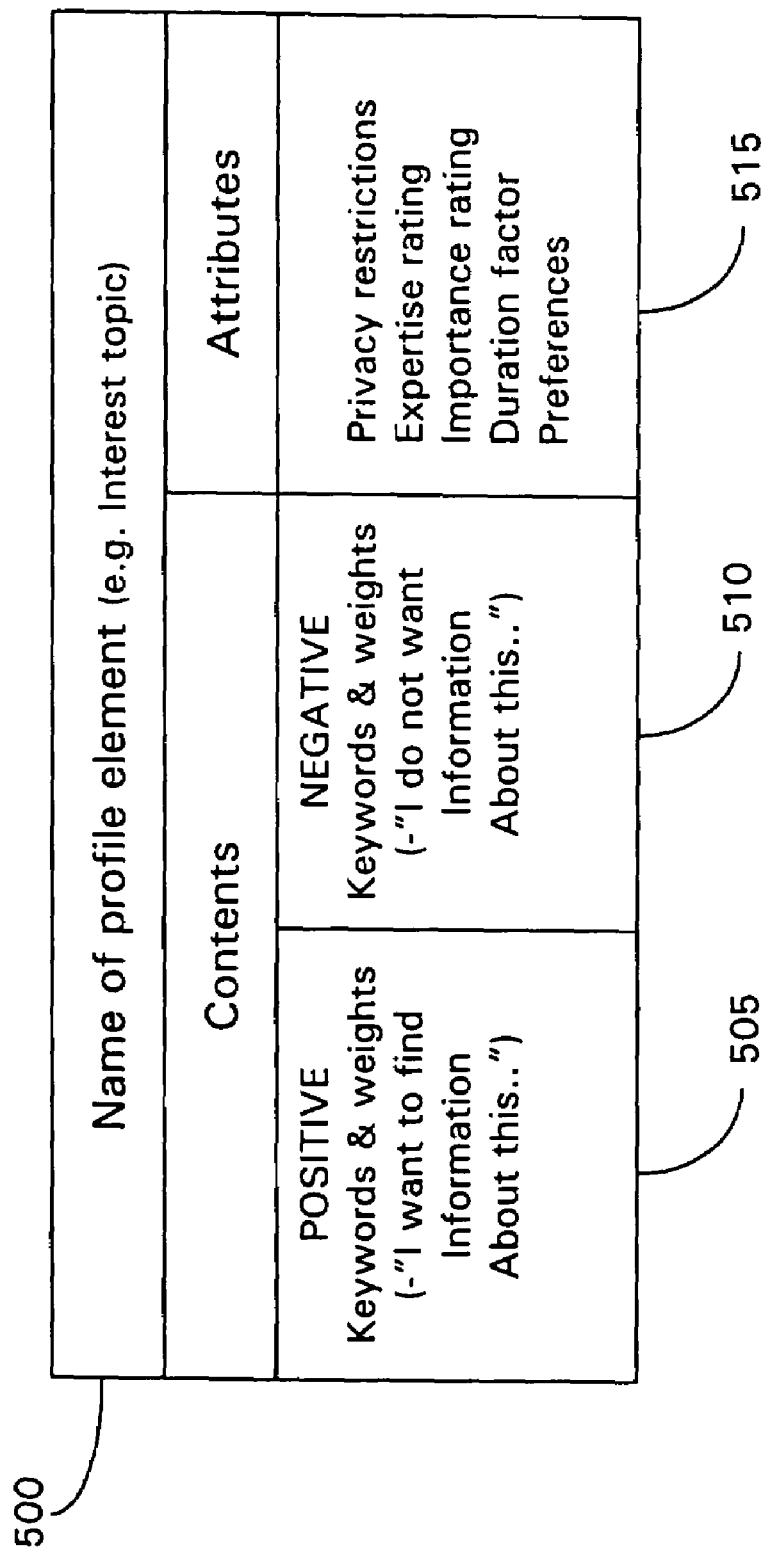
FIG. 5 is a diagram showing a preferred structure for a user profile for which updates may be generated by preferred embodiments of the present invention.

Referring to FIG. 5, the preferred profile structure comprises, for a each topic of interest, a data element having a topic name portion 500, a content portion comprising a list of positive keywords/phrases 505 and a list of negative keywords/phrases 510, together providing a description, from the user's perspective, of the named topic of interest 500, and an attribute portion 515 for the topic of interest 500. Attributes may include privacy markings for the interest topic (e.g. private, restricted, public), expertise ratings for the user in respect of the interest topic (e.g. curious, novice, competent, good, expert), a measure of importance of the interest topic to the user (e.g. low, medium, high), in indication of the duration of the interest to the user (e.g. short, medium, long), and user preferences, for example particular preferences used to personalize various aspects of the preferred profile update inference process as described in overview above. For example, the value of the duration attribute may be converted into an approximate number of days from the time of creation of an interest topic, according to the user's personal preference.

Preferably, user preference data stored within the preferred profile structure comprise a set of <parameter_name>, <parameter value> pairs appropriate to the internal working of the preferred profile update inference process. For example, user preference parameters may include a creation date for the interest topic, personal definitions of time-related parameters (e.g. short/long term, early morning), and permissions or exclusions indicating which of the data entities stored within the user profile may be subject to updating by the preferred profile update inference process.

The preferred profile structure of FIG. 5 provides an increased level of detail on comparison with more convention user profiles, enabling more accurate customisation. For example, whereas a simple profile at an information portal might contain 'project management' as an interest for a user, or a profile on an e-commerce site retains information about project management software products and books that a user has purchased, the preferred profile structure is able to encapsulate a much richer representation of the user's interests, indicating for example, that for a particular interest topic, the user's expertise level is high, the topic is currently of low importance to the user, although it is a persisting long term interest, and that the user restricts the sharing of profile information on this interest topic (privacy level) to only a select list of other users.

The preferred profile structure facilitates independent update to either or both of the contents portion 505 of the profile and the attributes portion 510. For example, the user may expand the scope of interest in interest topic (500) "project management" to add the key phrase "contract negotiations" to the list of positive keywords 505, without changing any of the associated attributes 515 for that interest topic. Conversely, the interest descriptions 505, 510 may remain the same, but the preferred profile update inference process may determine that the importance (priority) level of the topic to the user has increased due to evidence of frequent use or searches for information and people in relation to this particular topic.

Software Implementation

Figure 6:
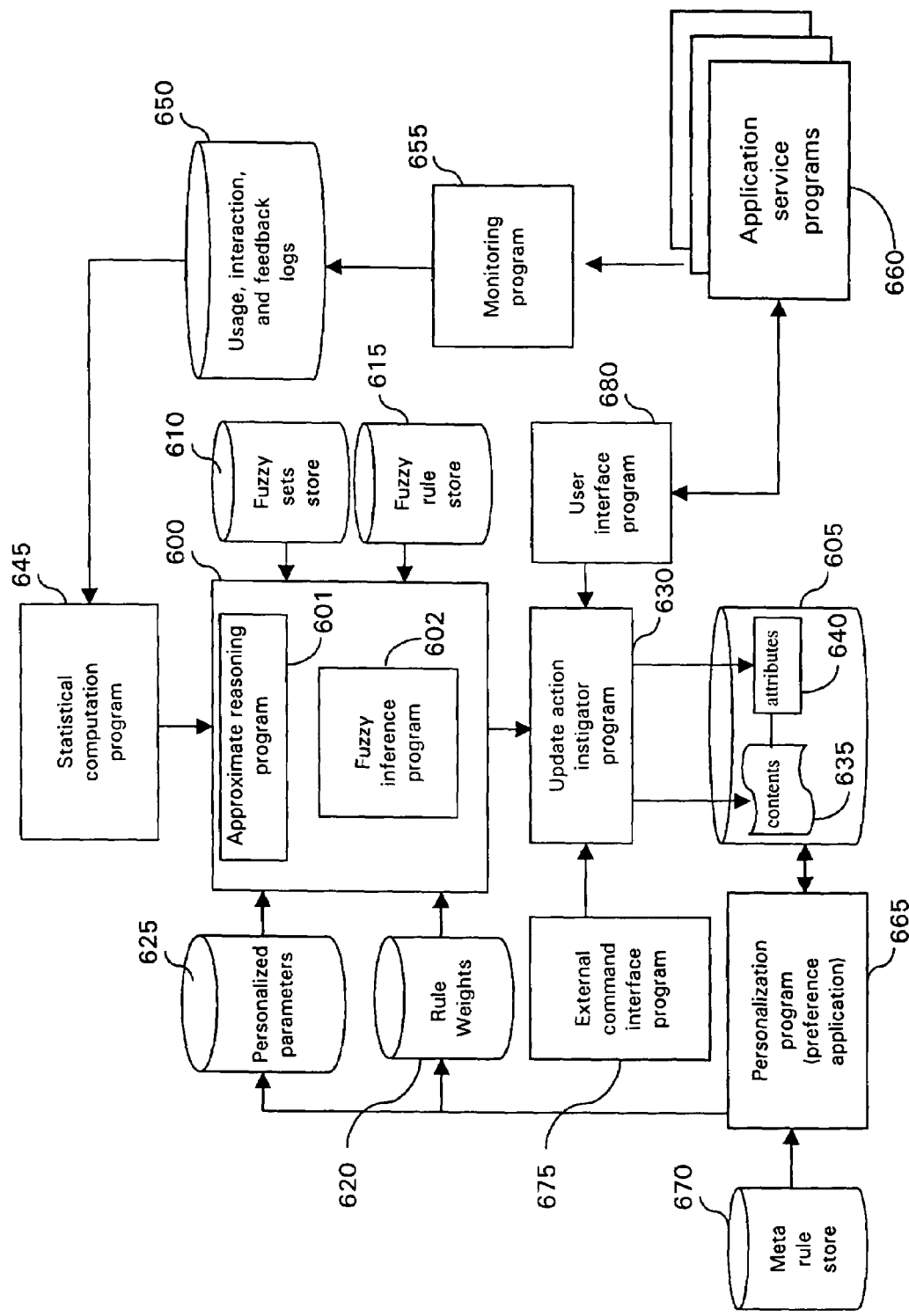
FIG. 6 is a diagram showing an arrangement of software modules in a preferred implementation of the present invention.

Preferred embodiments of the present invention may be implemented as modules of software suitable for running on a conventional server computer. A preferred architecture of software modules will now be described with reference to FIG. 6. FIG. 6 is a diagram representing an architecture of software modules for what in practice would be a complete user profile update system, for example a profile server 320 mentioned above with reference to FIG. 3. Not all the software modules shown in the diagram of FIG. 6 implement essential features of the present invention. Whether or not a particular software module implements an essential feature of the present invention will be discussed when referring to the respective modules in the description that follows.

Referring to FIG. 6, a fuzzy inference module 600 is arranged to generate updates to data elements of a user profile stored in a user profile store 605. The fuzzy inference module is arranged to implement a combination of conventional fuzzy inference processing, with reference to a store of fuzzy sets 610 and a store of fuzzy rules 615, and personalized processing according to a preferred embodiment of the present invention, with reference to a store of rule weights 620 and a store of personalized parameters 625, as will be described in more detail below. The fuzzy inference module comprises an approximate reasoning program 601, arranged to process input parameters, preferably applying personalized definitions of fuzzy sets (610) in an otherwise conventional fuzzy mapping process arranged to map those input parameters to fuzzy rules (615), and a fuzzy inference program 602, arranged to apply the fuzzy rules (615), though again with an element of personalisation in the application of those fuzzy rules (615) as will be described in detail when describing a preferred user profile update process below.

Generated profile updates are implemented by an update action instigator program 630. Update actions may result in the update of user profile contents 635, e.g. keywords/phrases and weightings descriptive of a particular interest topic, the update of attributes 640 associated with that interest topic, e.g. importance/privacy markings or user preference data stored in the user profile (605), or the update of both content 635 and attribute data 640.

The fuzzy inference module 600 receives event statistics from a statistical computation program 645 arranged to calculate a number of predefined event statistics using, in particular, data stored in a store 650 of user activity logs. The event statistics calculated by the statistical computation program 645 are tailored to the input requirements of the fuzzy inference module 600, in particular to enable event statistics to be mapped to antecedent portions of fuzzy rules (615) by the approximate reasoning program 601 at a first stage in the operation of the fuzzy inference module 600. The statistical computation program 645 is arranged to implement a combination of conventional statistical processing of log data (650) and personalized processing according to a preferred embodiment of the present invention, making use of the store 645 of personalized parameters in the calculation of particular event statistics. For example, personalized parameters (625) may define a user's perception of a "short" duration time period, when considering the duration of a particular topic of interest, as one week. The statistical computation program 645 calculates from logged activity (650) the number of times that the user accessed documents relating to that particular interest topic over a "short" time period, in this case over a one week period, and outputs that particular event statistic to the fuzzy inference module 600. For another user the "short" duration time period may be only one day, but the statistical computation program 645 is able to substitute the appropriate value of "short" according to the particular user, so providing one aspect of personalisation at this stage of the profile update process.

The user activity logs (650) are populated with the output from conventional user monitoring programs 655, each arranged to monitor a particular aspect of a user's activity. For example, in a preferred embodiment of the present invention, monitor programs 655 are arranged to capture so-called "implicit" data relating to the following non-limiting list of user activities:

interest topics accessed;
interest topics searched;
people searched;
documents used;
expertise level of documents used;
tasks accessed;
meetings initiated; and
meetings attended.

Monitoring programs 655 are also arranged to capture so-called "explicit" data, for example user feedback indicative of the perceived relevance of a document to a particular interest topic. Monitoring programs 655 are arranged to monitor, in particular, a user's access to selected application programs and services 660 in order to capture activity data (650). Activity data (650) may be captured by monitoring programs 655 on a continual basis in respect of each of a predefined set of interest topics, e.g. those defined in user profiles (605). In general, monitoring programs 655 are directed to capture any data that may be useful in verifying and deducing changes to personal information typically stored in user profiles (605).

A personalisation program 665 is provided to apply user preference data, in particular those stored in the user profile store 605, to personalize various aspects of an otherwise conventional fuzzy inference process implemented by the fuzzy inference module 600. The personalisation program 665 operates with reference to meta-rules stored in a meta-rule store 670 to set and adjust personalized parameters (625), so determining the extent to which operation of the statistical computation program 645 and/or the fuzzy inference module 600 are personalized to a user's preferences, or to those of a group of users, according to preferred embodiments of the present invention. Preferred aspects of personalisation in the operation of a preferred user profile update process, including personalisation of the operation of the fuzzy inference module 600, will be described in more detail below.

Although the monitoring programs 655 may be arranged to capture and store user activity data and/or user feedback on a continual basis, those software modules involved in the generation of updates to user profiles (605) according to a preferred user profile update process, to be described below, may be triggered to operate periodically, e.g. nightly or weekly, as determined by a system administrator. It is known that processes can be scheduled to execute automatically on a periodic basis. In a preferred embodiment of the present invention, a controlling process may be executed, for example by the personalisation program 665, to execute a process of nested loops to periodically generate profile updates for each interest topic relevant to a user, and for each user, as follows:

```
for each user {
    for each interest {
        adaptProfile( );
    }
}
``` where the function "adaptprofile()" denotes the collection of software processes involved in the periodic generation of profile updates from captured user activity data (650).

Preferably, the update action instigator program 630 is arranged to receive input from an external command interface program 675, so providing means for external control over the update of a user profile (605) or for the receipt of profile update commands to supplement those output by the fuzzy inference module 600. If both external commands (675) and output from the fuzzy inference module 600 are present, the update action instigator program 630 may be arranged to perform all actions sequentially or to give one command priority over the other according to a mode setting (by the system administrator).

Preferably, a user interface program 680 is also provided to enable a user to set and adjust, for example by means of a forms-based user interface, user preference data stored in a respective user profile (605). Updates to user preference data are communicated by the user interface program 680 to the update action instigator program 630 for implementation. The user interface program 680 is also arranged with access to application service programs 660 as either further sources of user preference data or as receivers of user preference data entered by a user at the user interface (680).

Profile Update Process

A user profile update process according to a preferred embodiment of the present invention will now be described with particular reference to FIG. 7 and FIG. 8, making reference to apparatus features and software modules of FIG. 2 and FIG. 6 respectively as appropriate. The preferred user profile update process to be described is, in practice, triggered to operate periodically, making use of logged user activity data (655), and the process will be described with particular reference to features that relate to personalisation of that process.

Figure 7:
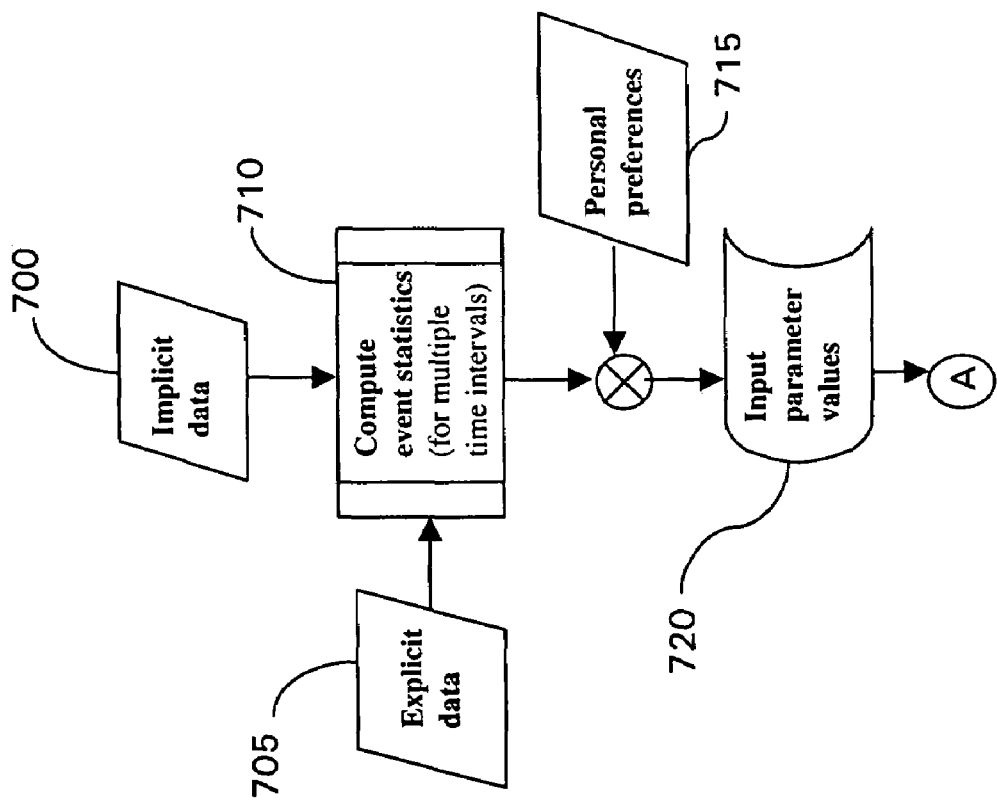
FIG. 7 is a process diagram showing a first part of a preferred user profile update process.

Referring firstly to FIG. 7, a portion of a process diagram is provided to show steps in the preferred user profile update process up to determination of input parameter values (event statistics) suitable for input to the first stage of processing by the fuzzy inference module 600 of FIG. 6. Implicit data 700 and explicit data 705 are read from the user activity logs (650) and used at STEP 710 to compute event statistics. Where a user's personal preferences 715 have defined the meaning of certain parameters used in the calculation of event statistics, these are also input to the statistical computation at STEP 710 in order for the input parameter values 720 to be calculated and output (A). For example, as mentioned above, personal preference data 715 may define the value of a "short" duration time interval for use in an event frequency calculation at STEP 710. Typically, at STEP 710, event statistics are calculated for multiple time intervals according to user-defined or preset time duration values. To give a specific example, a set of input parameter values 720 calculated at STEP 710 may be as follows:

```
readArticlePerDay = 3.5
readArticlePerWeek = 10
numOfLowExpertiseArticles = 7
daysToExpireInterest = 5   //function of current date, creation date,
                           // and user-defined interest duration.
```

The particular selection of input parameters calculated at STEP 710 will vary according to the domain of application, for example, for an e-commerce profile server, the number of product X purchased by customer Y per week may be computed.

Figure 8B:
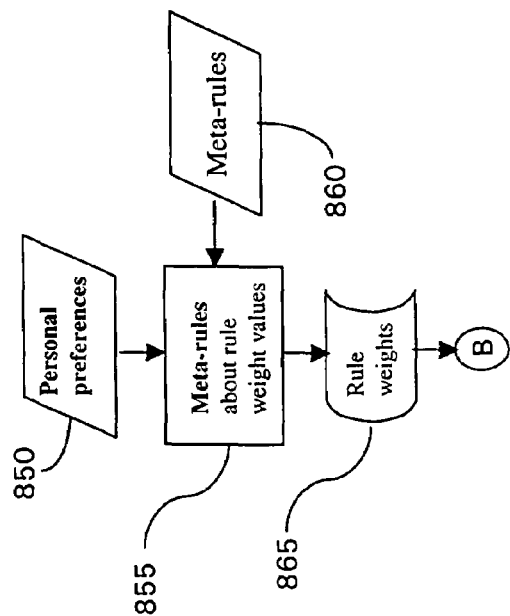
FIG. 8 is a process diagram showing a second part of a preferred user profile update process.
Figure 8A:
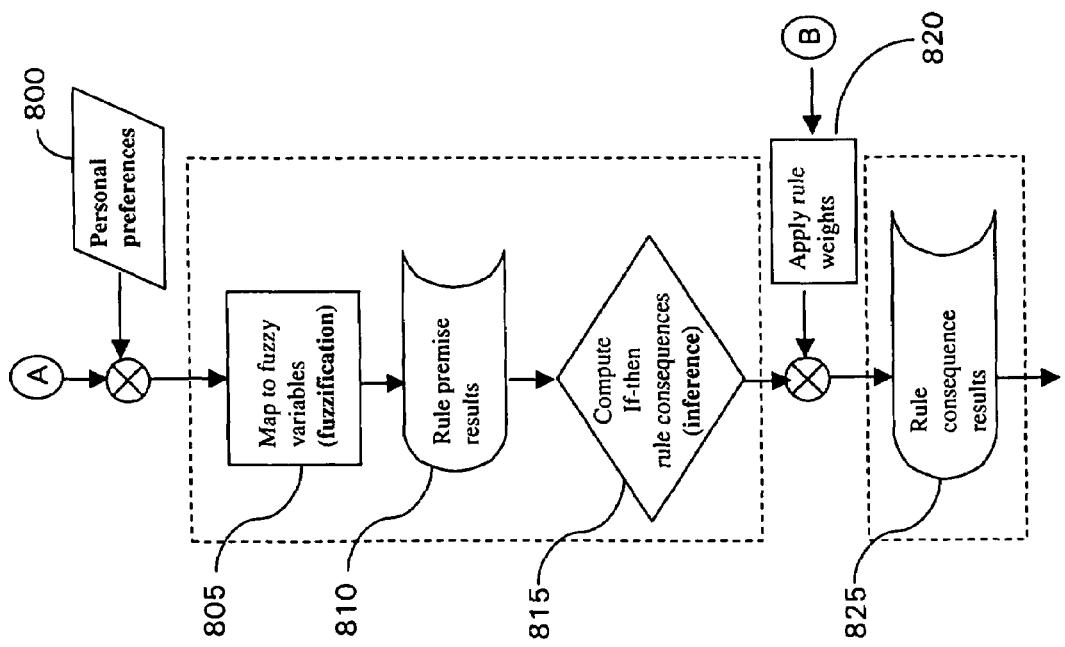
Figure 9A:
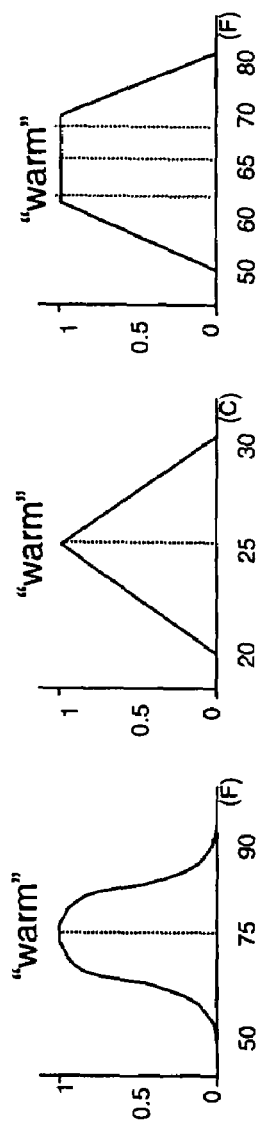
FIG. 9 shows a sample of typical representations of fuzzy sets as used in preferred embodiments of the present invention.
Figure 9B:
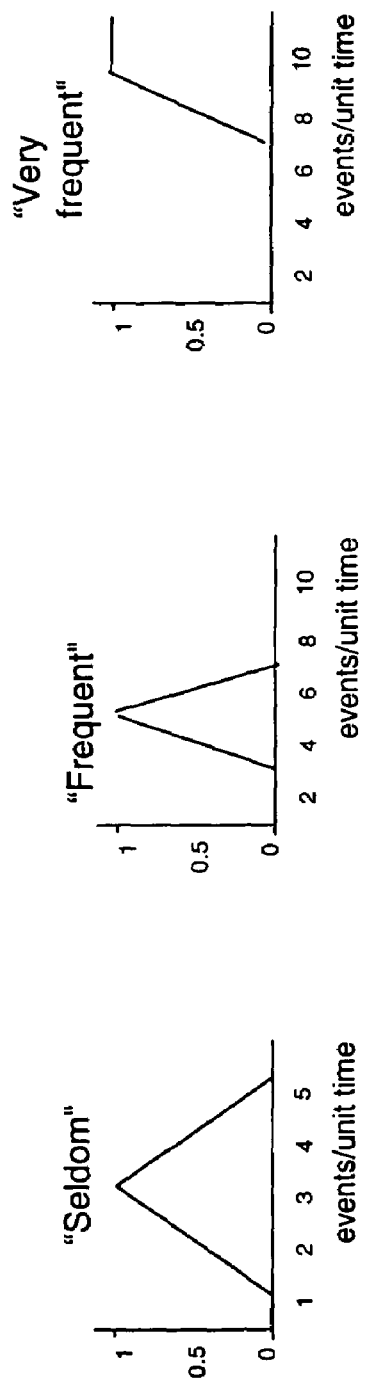

Referring now to FIG. 8, a further portion of the preferred user profile update process is shown in two parts. Referring firstly to FIG. 8a, the input parameter values 720, output (A) from that portion of the process shown in FIG. 7, are subject to further personalized processing at STEP 805, a first step in the operation of the approximate reasoning program 601 of fuzzy inference module 600. Certain fuzzy sets (215, 610) may be defined according to a user's personalized preferences 800. Personalized definitions of fuzzy sets (215, 610) may relate to the end-point values of a fuzzy set or to the shape of the fuzzy set. Referring to FIG. 9a, three examples are shown of differently shaped fuzzy sets representing the temperature-related term "warm", any one of which may be selected as a particular user's personal fuzzy definition of "warm". Referring to FIG. 9b, a further example is shown, this time of a particular user's personal definition of terms relating to frequency, in this case fuzzy sets representing the terms "seldom", "frequent" and "very frequent" for that user. Preferably, the values of parameters defining particular fuzzy sets for each user are stored as user preferences in a respective user profile (605) and made available to this part of the process as personal preferences 800.

Therefore, at processing STEP 805, these personal preference data 800 are read and the fuzzy variables (215, 610)

thereby defined are used in mapping the input parameters 720 to fuzzy variables expressed in antecedent portions of fuzzy rules (210, 615) used by the fuzzy inference program 602. The fuzzy mapping technique itself—known as "fuzzification"—is conventional and well known. In the fuzzy mapping technique, an attempt is made to map each input parameter (event statistic) to fuzzy sets (215, 610) whether personalized or fixed.

Figure 10B:
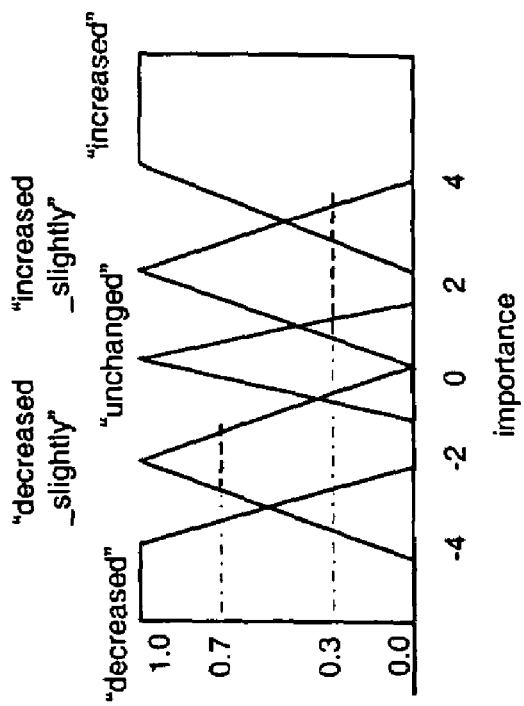
FIG. 10 shows two diagrams, the first being an example of a mapping of an input parameter to fuzzy sets and the second showing the result of a corresponding defuzzification step.
Figure 10A:
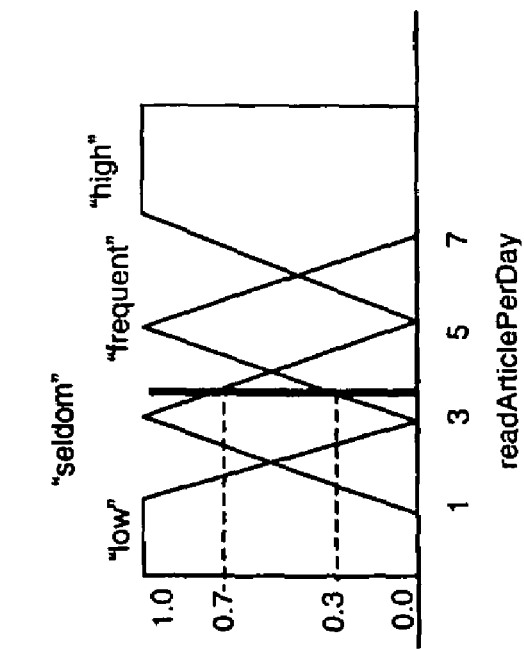

Referring to FIG. 10a, an example is shown whereby a particular event statistic, e.g. readArticlePerDay=3.5, is mapped to the user's personalized fuzzy definitions of frequency-related terms (shown in FIG. 9b) in order to determine a fuzzy membership value for that input. This mapping may be made in the context of a number of fuzzy rules (210, 615) testing the frequency of particular events. For example, consider two fuzzy rules j and k having antecedent portions as follows:

(rule j): IF readArticlePerDay IS frequent THEN . . .
(rule k): IF readArticlePerDay is seldom THEN . . .

where frequent and seldom are the fuzzy sets shown in FIG. 9b. The mapping ("fuzzification") of event statistic readArticlePerDay=3.5 is shown by FIG. 10a to yield fuzzy membership value 0.3 for rule j and 0.7 for rule k. This implies that the input value of 3.5 has a membership value of 0.3 in the frequent fuzzy set, and a membership value of 0.7 in the seldom fuzzy set.

A collection of the results from the fuzzification process for the antecedent portions (IF-parts) of fuzzy rules stored in the fuzzy rule store 210, 615, are temporary stored as rule premise results 810 in FIG. 8a and propagated to STEP 815, corresponding in operation to that of the fuzzy inference program 602 of FIG. 6, to compute the rule consequences (THEN-parts) for each fuzzy rule (210, 615). All rules processed at STEP 815 with non-zero premises are instantiated to compute their consequences. Different rules contribute to a decision to update a user profile (605) to different degrees. For example, the consequence fuzzy set in rule j would be scaled or clipped (depending upon whether a max-min or max-dot algorithm is being applied) to a factor of 0.3 times the maximum, while the consequence fuzzy set of rule k would be scaled or clipped to a factor of 0.7 times the maximum. Note that more complex expressions in the premise are permitted, for example various combinations of AND and OR operators with hierarchical parentheses.

Let $\mu_A(x)$ denote the membership value of input parameter x as applied to fuzzy set A and let $\mu_B(y)$ denote the membership value of input parameter y as applied to fuzzy set B. For the max-min inference method, min operation $$[\mu_A(x) \cap \mu_B(y)]$$

is used for the AND conjunction (set intersection) and max operation $$[\mu_A(x) \cup \mu_B(y)]$$

is used for the OR disjunction (set union). The antecedent values in each rule are used to clip the corresponding output membership function shapes. If multiple rules have the same consequent label, the max operation is used to resolve conflicts. The clipped membership functions are then merged to produce one final fuzzy set. The max operation is used to merge overlapping regions. The max-dot method is similar, except that the antecedent values are used to scale the corresponding output membership functions and the algebraic sum operation $$[\mu_A(x) + \mu_B(y) - \mu_A(x) \cdot \mu_B(y)]$$

is used to merge overlapping regions.

Conventionally, fuzzy sets from the inference outputs of STEP 815 would be aggregated and "defuzzified" to produce profile update commands. However, according to preferred embodiments of the present invention, at STEP 820, personalized rule weights (240, 620) are applied to the output from STEP 815 of the consequences for each rule (210, 615). In applying the rule weights (240, 620), STEP 820 may be arranged to apply an arbitrary function to combine rule weights (240, 620) with rule consequences, but, preferably, the inference results for each rule (210, 615) are simply multiplied by the corresponding rule weight (240, 620). The value of each rule weight (240, 620) may range from 0 (blocked, no contribution) to 1 (unaffected, full contribution), and other values in between. The values of rule weights (240, 620) are assigned by the personalisation program 665 with reference to meta-rules (235, 670), as will now be described with reference to that portion of the preferred user profile update process shown in FIG. 8b before returning to complete the description of FIG. 8a.

Referring to FIG. 8b, a user's personal preferences 850 relating to the application of particular fuzzy rules (210, 615), e.g. those resulting in the update of certain attributes or user preferences in a user's profile (605), are read at processing STEP 855—corresponding in operation to the personalisation program 665 of FIG. 6—along with meta-rules 860 read from meta-rule store 670, to determine and output (B) the values 865 for particular rule weights (240, 620). Preferably a two-stage process is applied at STEP 855. For example, meta-rules (670) of the form IF excludeImportance is True THEN blockImportanceFlag IS True are firstly applied to generate a set of personalized parameters (625), e.g. blockImportanceFlag, from user preference data 850, e.g. excludeImportance. Secondly, personalized rule weights (240, 620) are set by checking the consequence of each of the fuzzy rules (210, 615) in turn and setting the corresponding rule weight (240, 620) to an appropriate value between 0 and 1, according to effect required by the expressed user preferences 850. In a example of a preferred implementation of this second stage of the rule weight setting process at STEP 855, a particular meta-rule may be applied to look for rules affecting a particular attribute, in this example the "importance" attribute, and depending upon the value of the blockImportanceFlag set among the personalized parameters 625 set during the first stage of the rule weight setting process at STEP 855, the corresponding rule weights (240, 620) may be set to either 0, to block the application of the fuzzy rule (210, 615), or 1, to enable the fuzzy rule (210, 615) to have full effect in updating the "importance" attribute in the respective user profile (605), should that fuzzy rule (210, 615) eventually "fire". The following routine may be executed at STEP 855 to implement this particular example:

```
int counter=0;
for each rule {
    if (blockImportanceFlag &&
        rule.antecedentContains(importanceParm))
    {
        ruleWeight.set(counter, 0.0);
    }
```

```
        else ruleWeight.set(counter, 1.0);
    // check other flags..
    //
        counter++;
}
```

A customized rule weight matrix 865 can thus be derived and output (B) based upon user preferences 850 and a set of meta-rules 860 (235, 670) to achieve selective personalized application of fuzzy rules (210, 615) or biasing of the importance of different fuzzy rules (210, 615) at processing STEP 820 of FIG. 8*a*. Conventionally, in prior art arrangements, all fuzzy rules would have been applied with equal importance.

Referring back to FIG. 8*a*, the final stage in the preferred user profile update process will now be described. The results of applying the rule weights (240, 620) at STEP 820 are output as rule consequence results 825. These results 825 are input to a "defuzzification" part of the fuzzy inference program 602, not shown in FIG. 8*a*, operating in a conventional way to aggregate rules, resolve conflicts and apply standard defuzzification to the results 825. In particular, the rule aggregation effect is achieved by the union of scaled or clipped fuzzy sets from all fired rules (210, 615) pertaining to a particular subject output variable. If different rules recommend opposing actions, their relative strengths will sway the end result towards the stronger recommendation. During defuzzification (computing a single number that best represents the outcome of the fuzzy rule evaluations), two common approaches used are the centroid and max-moment schemes. The centroid operation represented by the function $$x^* = \frac{\int x \mu_A(x) dx}{\int \mu_A(x) dx}$$

provides a compromise among the output actions recommended by different fuzzy rules, whereas the max-moment approach selects the abscissa coordinate of the centroid of the fuzzy set with the largest maximum grade (i.e. the centroid of the highest fuzzy set). Intuitively, the max-of-moment method provides the strongest action among the recommendations of different rules. The method can be selected by the system administrator. For most decision support applications, the centroid operation is preferred.

By way of example, consider rules j and k referred to above, which in full are expressed as:

(rule j): IF readArticlePerDay IS frequent THEN importance is increased_slightly;

(rule k): IF readArticlePerDay is seldom THEN importance is decreased_slightly

Referring to FIG. 10*b*, it can be seen from the representation of fuzzy sets defining the terms "deceased", "decreased slightly", etc. how the membership values from the example above are propagated through rules j and k, and a resultant fuzzy set is produced. After aggregating and applying centroid defuzzification, the final output value may be determined in this particular example to be −0.8, which implies that the importance attribute in the respective user's profile (605) should be slightly decreased in this case. This makes intuitive sense, because the input parameter value readArticlePerDay=3.5 was stronger for the seldom fuzzy set than the frequent fuzzy set.

The output from this defuzzification step is essentially a set of profile update commands corresponding to the output from the fuzzy inference module 600 of FIG. 6, for input to the update action instigator program 630 for implementation.

External Control

The external command interface program 675 of FIG. 6, discussed briefly above, allows for external control of this profile update process. An external control rule set may be provided and implemented by the external command interface program 675 to enable adjustments of profile attributes by an external request to be submitted and processed and subsequently implemented, for example if an independent service agent wishes to effect changes to a user profile (605). This action assumes that the external agent is a trusted party and has been approved for this collaborative operation. Preferably, external control requests are formatted as follows:

<agentID>, <recordID>, <parameter>, <value>.

Internally, validation rules such as:

IF agentID IS valid AND recordID IS found THEN parameter IS value may be applied by the external command interface program 675. The <recordID> attribute may be further decomposed into <userID> plus <interestName>. In this example, valid and found are simply Boolean status flags used in the validation rules.

The invention claimed is:

1. An apparatus for use in updating a user profile, the user profile being suitable for use in providing customized services to a respective user, the apparatus comprising:
    an input for receiving event statistics relating to a user's activity;
    a first rule store for storing a first set of rules;
    an inference engine for inferring updates to a user profile for the user according to said first set of rules using event statistics received at said input;
    a store for storing user preference data;
    a store for storing a set of personalized rule weightings in respect of said user;
    a second rule store for storing a second set of rules;
    adjustment means for adjusting said personalized rule weightings according to said second set of rules and with reference to said stored user preference data; and
    wherein said inference engine is arranged to use said personalized rule weightings in the application of said first set of rules to the inference of profile updates and thereby to determine and output a set of at least one update to the user profile.

2. An apparatus as in claim 1, wherein said stored user preference data include data providing a personalized definition of one or more parameters for input to said inference engine and wherein said inference engine further comprises means for mapping received event statistics to said personalized definitions of respective input parameters.

3. An apparatus as in claim 1 wherein said stored user preference data include data defining one or more event statistics to be calculated, said apparatus further comprising calculating means for calculating personalized event statistics with reference to said stored user preference data.

4. An apparatus as in claim 1, wherein said inference engine is a fuzzy inference engine and wherein said first set of rules comprises fuzzy rules.

5. An apparatus as in claim 1, wherein said inference engine is a fuzzy inference engine, and wherein said first set of rules comprise fuzzy rules and wherein said personalized definitions of input parameters comprise fuzzy data sets.

6. An apparatus as in claim 1 wherein said user preference data comprise one or more data elements stored with the user profile.

7. An apparatus as in claim 1 wherein the user profile comprises a plurality of terms and attributes and wherein said profile updates output by said inference engine comprise adjustments to said attributes.

8. An apparatus as in claim 6, wherein said profile updates output by said inference engine comprise adjustments to data elements of said user preference data stored within the user profile.

9. An apparatus as in claim 1 further comprising means for receiving profile updates from an external source and for aggregating said received updates with output from said inference engine.

10. A method of updating a user profile, the user profile being suitable for use in providing customized services to a respective user, the method comprising:
- (i) storing a first set of rules;
- (ii) generating a set of personalized rule weightings according to a second set of rules and with reference to a set of user preference data;
- (iii) receiving event statistics relating to a user's activity; and
- (iv) applying an inference engine to infer and output at least one update to a profile for the user according to said first set of rules weighted according to said generated set of personalized rule weightings, using said received event statistics.

* * * * *